US00RE40161E

(19) United States
(12) Reissued Patent
Panuce

(10) Patent Number: US RE40,161 E
(45) Date of Reissued Patent: Mar. 25, 2008

(54) CAM OPERATED INVERTER BYPASS SAFETY SWITCH

(75) Inventor: Donald G. Panuce, Longboat Key, FL (US)

(73) Assignee: Advance Controls, Inc., Bradenton, FL (US)

(21) Appl. No.: 09/505,317

(22) Filed: Feb. 15, 2000

Related U.S. Patent Documents

Reissue of:
(64) Patent No.: 5,721,449
Issued: Feb. 24, 1998
Appl. No.: 08/603,657
Filed: Feb. 20, 1996

(51) Int. Cl.
*H01H 19/60* (2006.01)
*H01H 21/80* (2006.01)
*H02J 9/00* (2006.01)

(52) U.S. Cl. ..... 200/14; 200/16 A; 200/18; 307/64

(58) Field of Classification Search ..... 200/4, 200/6 B, 6 BB, 14, 16 A, 17 R, 18, 558–573; 310/68 R–71; 307/64–80
See application file for complete search history.

(56) References Cited

U.S. PATENT DOCUMENTS 2,326,070 A * 8/1943 Schaelchlin et al. ..... 307/64
3,251,956 A * 5/1966 Rasor et al. ..... 200/14
3,260,803 A * 7/1966 Moroishi ..... 200/305
3,614,363 A * 10/1971 Fujita ..... 200/303
3,614,461 A * 10/1971 Speer et al. ..... 307/64
3,753,069 A * 8/1973 Newton ..... 307/64
3,987,268 A * 10/1976 Maeda et al. ..... 200/17 R
4,154,996 A * 5/1979 Arnold ..... 200/434
4,157,461 A * 6/1979 Wiktor ..... 200/18
4,295,054 A * 10/1981 Kovatch et al. ..... 200/50.34
4,371,820 A * 2/1983 Kruger ..... 200/501
4,398,097 A * 8/1983 Schell et al. ..... 307/64
4,423,336 A * 12/1983 Iverson et al. ..... 307/64
4,503,412 A * 3/1985 Alsch ..... 335/170
4,724,287 A * 2/1988 Heng et al. ..... 200/14
4,760,278 A * 7/1988 Thomson ..... 200/18
4,851,620 A * 7/1989 Schaeffer ..... 200/14
4,937,403 A * 6/1990 Minoura et al. ..... 200/50.21
5,023,469 A * 6/1991 Bassett et al. ..... 307/64
5,048,366 A * 9/1991 Spanio ..... 74/567
5,075,517 A * 12/1991 Spanio ..... 200/16 A
5,081,367 A * 1/1992 Smith et al. ..... 307/64
5,200,586 A * 4/1993 Smith et al. ..... 200/50.32
5,278,369 A * 1/1994 Spanio ..... 200/243

* cited by examiner

*Primary Examiner*—Michael Friedhofer
(74) *Attorney, Agent, or Firm*—Clausen Miller, P.C.

(57) ABSTRACT

An inverter by pass safety switch for rerouting electrical power either through or around AC variable frequency inverter drives during electrical disturbances, thus allowing a motor to continue operation. The switch works in a mechanical fashion, and comprises a contact block containing electrical contacts and cams operably connected to the contacts and mounted on a shaft that can be turned by an operator. The cams are shaped and mounted on the shaft in such a way to provide a desired switching pattern when the shaft is manually rotated.

5 Claims, 3 Drawing Sheets

FIG. 3
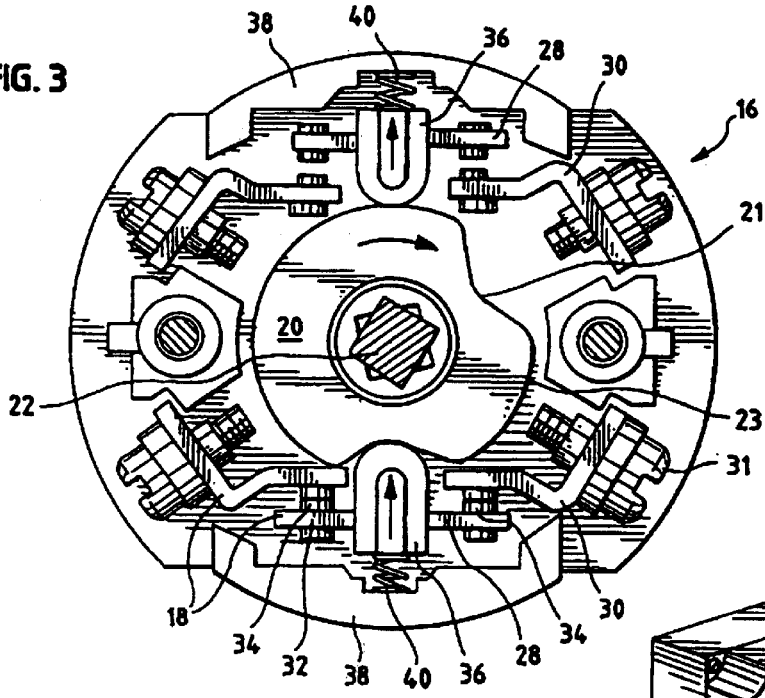
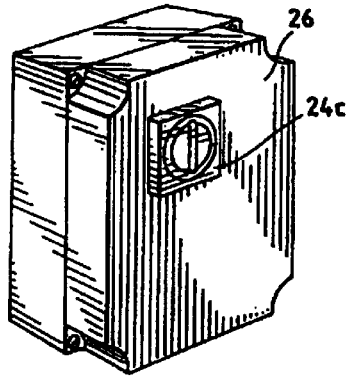
FIG. 5
FIG. 4
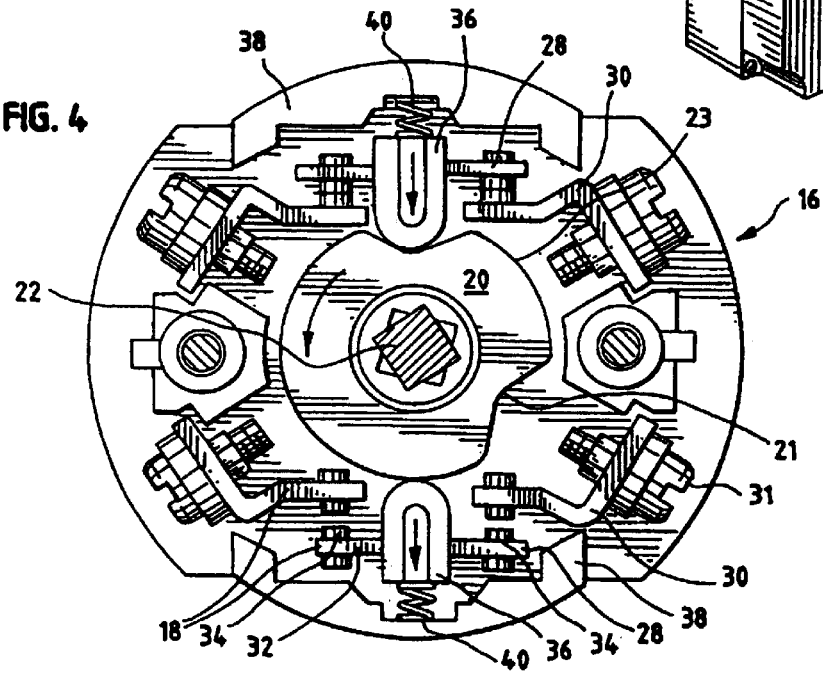

FIG. 6
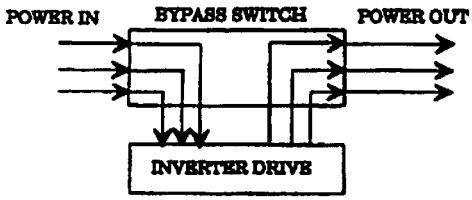
FIG. 7
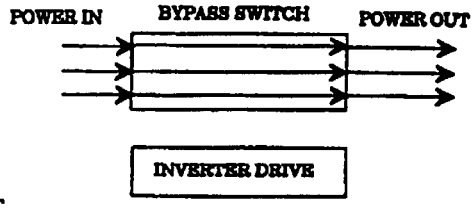
FIG. 8
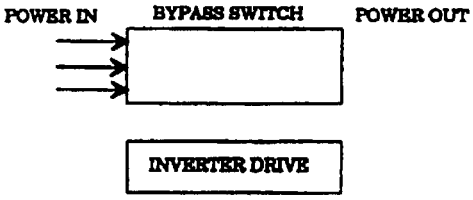
FIG. 9
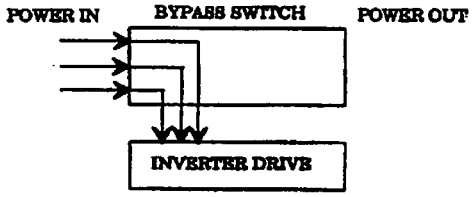
FIG. 10B
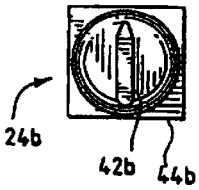
FIG. 10B'
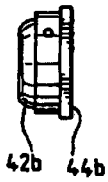
FIG. 10A
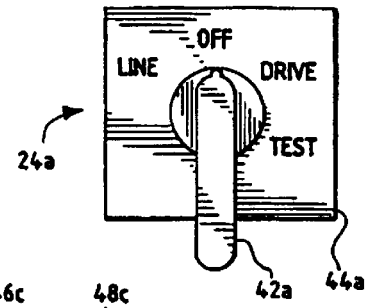
FIG. 10A'
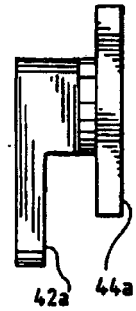
FIG. 10C
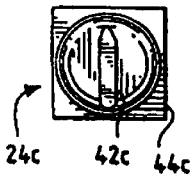
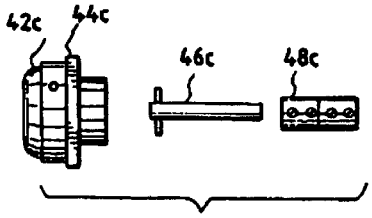
FIG. 10C'

CAM OPERATED INVERTER BYPASS SAFETY SWITCH

Matter enclosed in heavy brackets [ ] appears in the original patent but forms no part of this reissue specification; matter printed in italics indicates the additions made by reissue.

BACKGROUND

1. Field of the Invention

This patent relates to manually operated electrical switches. More particularly, this patent relates to a manually operated electrical switch that uses a shaft with a plurality of cams operatively connected to electrical contacts to provide the required switching action for rerouting electrical power either through or around AC variable frequency inverter drives.

2. Description of the Related Art

Inverter drives, or inverters for short, are solid state devices used to vary the speed of common three phase electric motors. Inverters are common in industry and are used in conveyors, fans, cooling towers, extruders, and other applications. However, since inverters are solid state devices, they are vulnerable to lightning strikes, power surges, low voltages, and other disturbances in the electrical line. When disturbances occur, inverter drives can fail. Failure of the inverter drive can stop the motor from operating, thus stopping the application.

Several methods have been developed to isolate inverters during electrical disturbances. However, these methods involve expensive and unreliable contactors, relays and timers.

The present invention is designed to provide a simple means of isolating an inverter drive during an electrical disturbance to allow a motor to continue at full speed/full power operation until a safe stopping point is reached. This is accomplished by providing an inverter bypass safety switch that can route electrical power through or around an inverter simply by turning a handle on the switch.

Thus it is an object of my invention to provide a simple and reliable means for isolating an inverter during electrical disturbances so that the motor can continue at full speed/full power operation until a safe stopping point is reached.

Another object of the present invention is to provide a mechanical means for isolating an inverter. The present invention does not require contactors, relays, solenoids, or coils that can consume power, stick, or burn out.

Still another object of the present invention is to provide a means for isolating an inverter that uses positive break contacts. Should a contact "weld", the switch handle cannot be turned. If the switch handle cannot be turned, the contacts cannot transfer. If the switch handle is able to be turned, the contacts transfer. This feature assures the operator that when the switch has been turned the contacts have been transferred.

Yet another object of the present invention is to provide a switch having positive removal of the electrical power from the inverter drive. In other words, the switch can be used to disconnect power from both the incoming lines into the inverter and outgoing lines from the inverter.

Further and additional objects will become apparent from the description, accompanying drawings, and appended claims.

While other less desirable methods have been developed to isolate inverters during electrical disturbances, no prior inverter bypass switch is known that embodies and possesses all the aforementioned characteristics.

SUMMARY OF THE INVENTION

The present invention is an inverter bypass safety switch comprising a contact block containing a plurality of electrical contacts and a plurality of cams operably connected to the electrical contacts so that rotation of the cams opens or closes the electrical contacts. Each electrical contact comprises two stationary contacts and a moveable contact. The moveable contacts move in response to the movement of the cams.

The cams are mounted on a shaft that can be turned by an operator. The cams are shaped to provide a desired switching pattern when the shaft is manually rotated. Although any number of switching patterns may be employed, four are described below: DRIVE, LINE, OFF, and TEST.

In the DRIVE position, electrical power is routed through the switch to an inverter drive, from the inverter drive back to the switch and then to a motor. This is the normal position used when providing power to an application.

In the LINE position, electrical power is routed from an incoming power source through the switch and directly to the application. This position is used when an operator wants to isolate the inverter drive, such as for repairs or replacement, while not shutting down the application.

In the OFF position, electrical power is disconnected from both the inverter drive and the application. This position typically is used when an operator wants to shut down the application.

In the TEST position, electrical power is routed from an incoming power source though the switch to an inverter drive, but no power is sent to the application. The TEST position may be used to set up the inverter drive parameters, test the inverter drive function, change settings on the inverter drive, and in any other situation where it is desirable to power the inverter drive but not allow power to the application.

Other switching patterns can be made to suit operator requirements. The switch may connected to a fuseblock to protect the motor against short circuits, to a disconnect switch, or to a manual motor starter.

THE DRAWINGS

FIG. 3 is a cross sectional view of the inverter bypass safety switch, taken along line 3—3 of FIG. 2.

FIG. 4 is a cross sectional view of the inverter bypass safety switch, taken along line 3—3 of FIG. 2, the cam having been rotated approximately 60 degrees in a counterclockwise direction from the orientation shown in FIG. 3.

FIG. 5 is a perspective view of the inverter bypass safety switch of FIG. 1 enclosed in an enclosure.

FIG. 6 is a schematic diagram of the inverter bypass safety switch showing the switch in the DRIVE mode.

FIG. 7 is a schematic diagram of the inverter bypass safety switch showing the switch in the LINE mode.

FIG. 8 is a schematic diagram of the inverter bypass safety switch showing the switch in the OFF mode.

FIG. 9 is a schematic diagram of the inverter bypass safety switch showing the switch in the TEST mode.

FIG. 10A is a front and side view of one embodiment of a handle assembly for the inverter bypass safety switch, referred to herein as the "Selector Style".

FIG. 10B is a front and side view of a second embodiment of a handle assembly for the inverter bypass safety switch, referred to herein as the "Lockout Style".

FIG. 10C is a front and side view of a third embodiment of a handle assembly for the inverter bypass safety switch, referred to herein as the "Panel Mount Style".

DETAILED DESCRIPTION OF THE INVENTION

Figure 1:
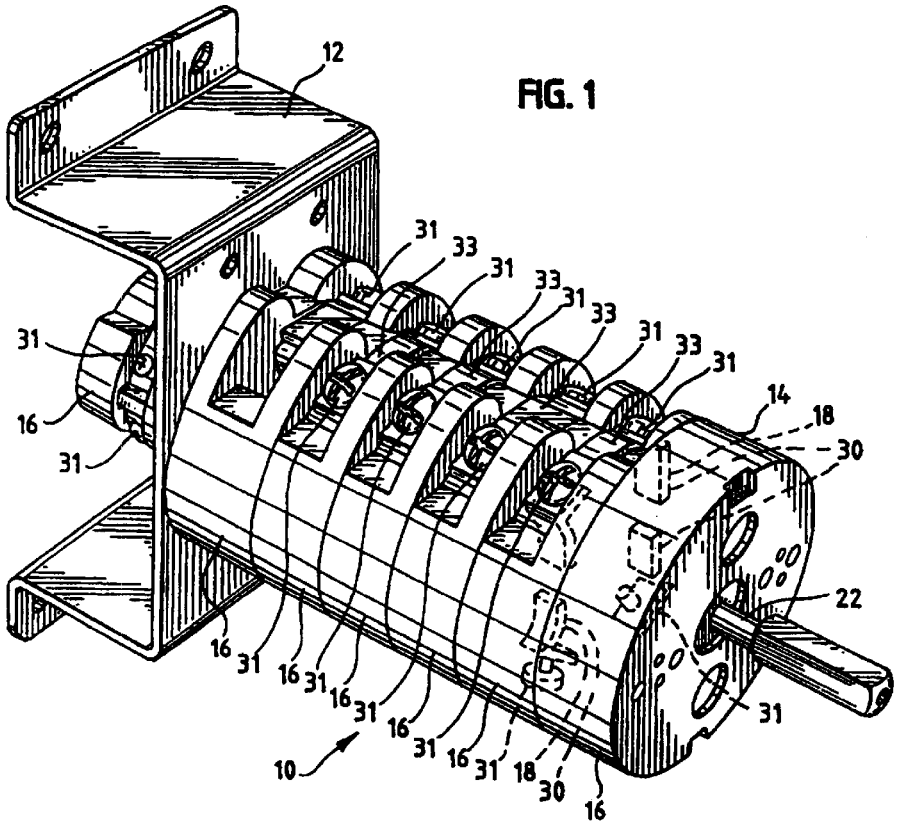
FIG. 1 is a perspective view of one embodiment of the inverter bypass safety switch of the present invention.
Figure 2:
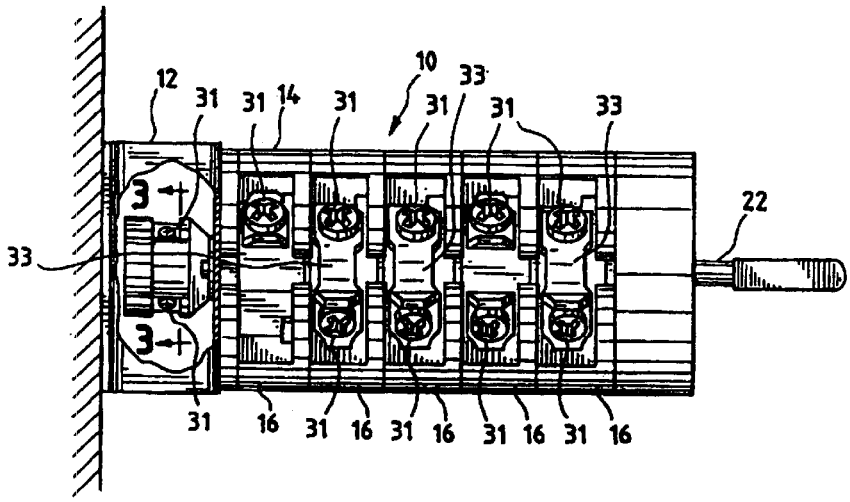
FIG. 2 is a side elevational view of the inverter bypass safety switch of FIG. 1, with the base shown in partial cutaway to show the auxiliary contacts.

Turning to the drawings, there is shown in FIGS. 1 to 4 one embodiment of an inverter bypass safety switch 10 according to the present invention. The switch 10 comprises a base 12, a contact block 14 mounted on the base 12 and divided into sections 16, electrical contacts 18 located within the sections 16, cams 20 operatively connected to the electrical contacts 18, and a shaft 22 connecting all of the cams 20 together. A handle assembly 24 (FIGS. 10A, 10B and 10C) attached to the shaft 22 is manipulated by an operator to turn the shaft, thereby selecting a desired operating mode. An enclosure or housing 26 (shown in FIG. 5) allows for easy mounting of the switch 10 on a wall.

The contact block 14 may include up to nine power contacts and two auxiliary contacts. The power contacts direct the incoming power either to and from the inverter drive, or directly to the motor, bypassing the inverter. The auxiliary contacts may be used to control a drive control circuit, send signals to a PLC, pilot light, or other device.

In the illustrated embodiment, the five sections 16 above the base 12 contain the nine power contacts, and the section 16 below the base 12 contains the two auxiliary contacts. As shown in FIGS. 3 and 4, a cam 20 located within each section operates the electrical contacts 18.

Preferably, the contacts 18 are double make/break contacts. That is, each contact 18 has a moving contact 28 and a pair of stationary contacts 30. In the preferred embodiment, each moving contact 28 comprises a copper bar 32 with silver cadmium oxide contact points 34 on each end. The silver cadmium oxide contact points 34 carry the amp switching load. Each moving contact 28 is held in a follower 36 which is keyed into the housing 38 of the switch 10. The follower 36 is acted upon by the shaft-mounted cam 20.

Preferably, two stationary contacts 30 are located on either side of each moveable contact 28 and are be made of the same materials as the moveable contacts 28. The stationary contacts 30 are keyed into the housing or body 38 of the switch 10, and are connected to electrical terminals 31 for fastening external body wires to the switch 10. Some of the electrical terminals 31 are connected by electrically conductive bridges 33 to other terminals in the same section 16 of an adjacent section 16.

Each cam 20 has a profile cut into the cam 20 that determines the switching pattern. The profile may include low sections 21 and/or high sections 23. Each follower 36 is connected to a spring 40 that biases the moveable and stationary contacts 28, 30 in a closed (together) position when the cam 20 is rotated such that a low section 21 of the cam profile faces the follower 36. The moveable and stationary contacts 28, 30 are mechanically opened when the cam 20 is rotated to a high section 23 of the cam profile. Opening the contacts 18 does not require use of the spring 40.

The shaft 22 connects all the cams 20 together, and is itself connected to an operating handle 42. The operating handle 42 can be turned by the operator. The operating handle 42 is part of the handle assembly 24.

By varying the shape of the cams 20 and the orientation of the cams 20 into the shaft 22, various switching patterns can be achieved. Four different switching patterns or positions shall now be described.

In the DRIVE or normal position, shown schematically in FIG. 6, electrical power is routed through the switch 10 to the inverter drive 11, from the inverter drive 11 back to the switch 10, then to the motor. In the DRIVE position, full function of the inverter drive is available to the motor at all times.

In the LINE or bypass position, shown schematically in FIG. 7, electrical power is routed from the incoming power source through the inverter bypass safety switch 10 directly to the motor. Thus power is eliminated from both the input and output side of the inverter drive 11. In the LINE mode, the inverter drive 11 can be physically removed from service while the motor is left operating at full speed-full voltage.

In the OFF position, shown schematically in FIG. 8, electrical power is disconnected from both the inverter drive and the motor.

The TEST position, shown schematically in FIG. 9, electrical power is routed from the incoming power source through the inverter bypass safety switch to the inverter. No power is sent to the application.

The inverter bypass safety switch may be configured in either a two position, three position, four position unit, depending on the needs of the user. The two position unit has a DRIVE and a LINE position. The three position unit has DRIVE, LINE, and OFF positions. The four position unit has DRIVE, LINE, OFF and TEST positions. Other switching patterns can be achieved by changing the configuration of the cams.

The switch is operated in the following manner. The desired switching pattern is achieved by turning the operating handle 42 to the desired setting. Turning the handle causes the cams 20 to rotate, which acts upon the moveable contacts 28, either opening or closing the electrical connections between the moveable and stationary contacts.

As shown in FIGS. 10A, 10B and 10C, the handle assembly 24 has at least three embodiments. In the embodiment referred to herein as the "Selector Style" (FIG. 10A), the handle assembly 24a comprises a backplate 44a, an operating handle 42a mounted to the backplate 44a, and a gasket (not shown) mounted to the side of the backplate 44a opposite the handle 42a. If an electrical disturbance occurs, the operator can turn the handle 42a from, say, the DRIVE position to the OFF or LINE position and interrupt the flow of electricity through the inverter 10.

The embodiment referred to herein as the "Lockout Style" (FIG. 10B) includes all of the features of the Selector Style embodiment, and further comprises holes for mounting padlocks (not shown) to lock the handle 42b in the LINE, OFF, DRIVE, or TEST positions. In this way, the switch 10 can be locked into a desired position.

The embodiment referred to herein as the "Panel Mount" style (FIG. 10C) includes all of the features of the Lockout Style embodiment, and further comprises an extension shaft 46c and an extension shaft coupling 48c. The extension shaft 46c and extension shaft coupling 48c allow the switch 10 to be mounted on the rear panel of the enclosure 26, as shown in FIG. 5, while the handle assembly 24c is mounted on the front of the enclosure 26.

The unique features of the inverter bypass safety switch 10 include the following. First, unlike conventional switches, the present invention has positive removal of the electrical power from the inverter drive. In other words, the switch 10 can be used to disconnect power from both the incoming lines into the inverter drive 11 and outgoing lines from the inverter drive 11, as shown in FIG. 7.

Second, the present invention features entirely mechanical operation. That is, the switch 10 does not depend on coils, relays, contactors, or other electromechanical devices to switch power.

Third, the present invention features positive break contacts. This means that, should a contact 18 "weld", the operating handle 42 cannot be turned, thus assuring the operator that when the operating handle 42 has been turned the contacts 18 have been transferred. If the operating handle 42 is able to be turned, the contacts 18 transfer.

It is anticipated that the switch 10 may be enclosed in a UL listed nonmetallic enclosure such as the one shown in FIG. 5 or other enclosure as desired, allowing for easy installation of the switch on a wall. It is also anticipated that the switch 10 may be connected to a fuseblock to protect the motor against short circuits. It is further anticipated that the switch 10 can be enclosed in a nonmetallic enclosure or other enclosure with a disconnect switch, thus combining the features of an inverter bypass switch with a disconnect switch. Finally, it is anticipated that the switch 10 can be used in conjunction with a manual motor starter. The manual motor starter would provide protection against excessive motor current and short circuits. The manual motor starter could be reset like a circuit breaker.

Although the foregoing invention has been described in some detail for purposes of clarity and understanding, it will be obvious that certain modifications and alternative embodiments of the invention are contemplated which do not depart from the spirit and scope of the invention as defined by the foregoing teachings and appended claims.

I claim as my invention:

1. An inverter bypass safety switch for rerouting electrical power either through or around an inverter drive during electrical disturbances and suitable to directly handle high power motor loads, said switch comprising one or more sections joined together [by throughbolts] to form a [substantially cylindrical] contact block having a central axis, a rotatable shaft disposed along the central axis, electrically conductive exterior interconnections for connecting selected stationary contacts, externally mounted electrical contacts for receiving electrical wires, and a handle mounted on one end of the shaft that can be turned by an operator, each section comprising:

a cam mounted on the shaft;

at least one [pair of] stationary [contacts] *contact* connected to the contact block; and at least one radially sliding moveable contact operably connected to the cam by a spring-loaded follower that biases the moveable contact into engagement with the [pair of] stationary [contacts] *contact* when a low profile section of the cam faces the follower;

wherein manual rotation of the shaft causes the cam to rotate and act upon the moveable contact to cause the moveable contact to move either into or out of engagement with the stationary [contacts] *contact*, thus causing electrical power to be directed either through or around the inverter drive.

2. The inverter bypass safety switch of claim 1 wherein the shape of the cams, the placement of the cams within the sections and in relation to the other cams, the placement of exterior interconnections of the stationary contacts and the attachment of exterior wires are all selected to provide four discreet switching patterns, namely:

a DRIVE pattern, wherein electrical power is routed through the inverter bypass safety switch to the inverter drive, from the inverter drive back to the inverter bypass safety switch and then to an application;

a LINE pattern, wherein electrical power is routed from an incoming power source through the inverter bypass safety switch and directly to the application;

an OFF pattern, wherein electrical power is disconnected from both the inverter bypass safety switch and the application; and a TEST pattern, wherein electrical power is routed through the inverter bypass safety switch to the inverter drive, but no power is sent from the inverter drive to the application.

3. An inverter bypass safety switch for rerouting electrical power around an inverter drive during electrical disturbances, said switch comprising:

a base having two sides;

one or more power sections stacked on one side of the base and joined together [by throughbolts] to form a substantially cylindrical contact block having a central axis, each power section comprising a body portion, a cam mounted on a rotatable shaft extending through the power sections along the contact block central axis, at least one pair of stationary contacts keyed into the body portion of their respective section of the contact block and electrically connected to externally mounted electrical terminals for fastening external wires, and at least one radially sliding moveable contact operably connected to the cam by a spring-loaded follower that biases the moveable contact into contact with the pair of stationary contacts when a low profile section of the cam faces the follower;

one or more auxiliary sections stacked on the base side opposite the power sections for controlling auxiliary devices; and electrically conductive exterior interconnections for connecting selected externally mounted electrical terminals;

wherein manual rotation of the shaft causes the cams to rotate and act upon the moveable contacts to cause them to move either into or out of contact with the stationary contacts, thus causing electrical power to be disconnected from both the incoming lines into the inverter drive and the outgoing lines from the inverter drive.

*4. The inverter bypass safety switch of claim 1 wherein the shape of the cams, the placement of the cams within the sections and in relation to the other cams, the placement of exterior interconnections of the stationary contacts and the attachment of exterior wires are all selected to provide three discreet switching patterns, namely:*

*a DRIVE pattern, wherein electrical power is routed through the inverter bypass safety switch to the inverter drive, from the inverter drive back to the inverter bypass safety switch and then to an application;*

*a LINE pattern, wherein electrical power is routed from an incoming power source through the inverter bypass safety switch and directly to the application; and*

*an OFF pattern, wherein electrical power is disconnected from both the inverter bypass safety switch and the application.*

*5. The inverter bypass safety switch of claim 1 wherein the shape of the cams, the placement of the cams within the*

*sections and in relation to the other cams, the placement of exterior interconnections of the stationary contacts and the attachment of exterior wires are all selected to provide two discreet switching patterns, namely:*

*a DRIVE pattern, wherein electrical power is routed through the inverter bypass safety switch to the inverter drive, from the inverter drive back to the inverter bypass safety switch and then to an application; and*

*a LINE pattern, wherein electrical power is routed from an incoming power source through the inverter bypass safety switch and directly to the application.*

* * * * *